United States Patent
Statman et al.

(10) Patent No.: US 11,996,531 B2
(45) Date of Patent: May 28, 2024

(54) MODULAR BATTERY STACK AND SUPPORT SYSTEM

(71) Applicant: Powin, LLC, Tualatin, OR (US)

(72) Inventors: Stu Statman, Portland, OR (US); Geoff Brown, Portland, OR (US)

(73) Assignee: Powin, LLC, Tualatin, OR (US)

( * ) Notice: Subject to any disclaimer, the term of this patent is extended or adjusted under 35 U.S.C. 154(b) by 371 days.

(21) Appl. No.: 17/273,696

(22) PCT Filed: Sep. 10, 2019

(86) PCT No.: PCT/US2019/050328
§ 371 (c)(1),
(2) Date: Mar. 4, 2021

(87) PCT Pub. No.: WO2020/055809
PCT Pub. Date: Mar. 19, 2020

(65) Prior Publication Data
US 2021/0336302 A1    Oct. 28, 2021

Related U.S. Application Data

(60) Provisional application No. 62/729,852, filed on Sep. 11, 2018.

(51) Int. Cl.
*H01M 10/627* (2014.01)
*H01M 10/42* (2006.01)
(Continued)

(52) U.S. Cl.
CPC ....... *H01M 10/627* (2015.04); *H01M 10/425* (2013.01); *H01M 10/465* (2013.01);
(Continued)

(58) Field of Classification Search
CPC ............. H01M 10/627; H01M 10/465; H01M 10/613; H01M 10/615; H01M 10/6563;
(Continued)

(56) References Cited

U.S. PATENT DOCUMENTS

| 4,994,940 | A |   | 2/1991 | Thouvenin et al. |
| 5,612,606 | A | * | 3/1997 | Guimarin ............ H01M 50/262 414/281 |

(Continued)

FOREIGN PATENT DOCUMENTS

| CN | 101443944 A | * | 5/2009 | .......... H01M 8/0271 |
| CN | 103518273 A | * | 1/2014 | .......... B60L 11/1866 |

(Continued)

OTHER PUBLICATIONS

Characteristics: Blue LMP® 250 and Blue LMP® 400; data sheet from www.blue-storage.com; 1 page.
(Continued)

*Primary Examiner* — Kaity V Chandler
(74) *Attorney, Agent, or Firm* — Klarquist Sparkman, LLP

(57) ABSTRACT

A modular unit, for use in a modular battery system, that can include a housing having a roof portion, a base portion, and two side portions; a central component disposed within the housing; and one or more electrical distributor units coupled to the housing and operatively coupled to the central component. The modular unit can be configured to be operatively connected to one or more additional modular units to create a modular battery system.

20 Claims, 14 Drawing Sheets

(51) Int. Cl.
*H01M 10/46* (2006.01)
*H01M 10/613* (2014.01)
*H01M 10/615* (2014.01)
*H01M 10/6563* (2014.01)
*H01M 50/204* (2021.01)
*H01M 50/251* (2021.01)
*H01M 50/262* (2021.01)
*H01M 50/271* (2021.01)

(52) U.S. Cl.
CPC ....... *H01M 10/613* (2015.04); *H01M 10/615* (2015.04); *H01M 10/6563* (2015.04); *H01M 50/204* (2021.01); *H01M 50/251* (2021.01); *H01M 50/262* (2021.01); *H01M 50/271* (2021.01); *H01M 2220/10* (2013.01)

(58) Field of Classification Search
CPC ............. H01M 50/204; H01M 50/262; H01M 50/271; H01M 2220/10; H01M 10/425; H01M 50/207; H01M 50/251; H02J 7/0013; H02J 7/00; H02J 50/10; H02J 7/34; H02J 3/32; H02J 7/0042; H02J 50/80; H02J 50/12; H02J 7/342; H02J 7/35; H02J 50/90; H02J 50/70; H02J 3/381; H02J 7/0047; H02J 7/0045; H02J 9/06; H02J 9/061; H02J 7/00714; H02J 9/062; H02J 2300/24; H02J 7/00036; H02J 2300/22; H02J 50/402; H02J 3/322; H02J 2300/28; H02J 2310/48; H02J 4/00; H02J 50/05; H02J 7/00041; H02J 7/0044; H02J 13/00028; H02J 2207/40; H02J 13/00034; H02J 2310/42; H02J 3/388; H02J 7/0016; H02J 2310/22; H02J 3/28; H02J 50/005; H02J 7/0068; H02J 13/00006; H02J 7/007; H02J 13/00001; H02J 13/00004; H02J 13/00007; H02J 13/00026; H02J 2203/20; H02J 2310/12; H02J 2310/40; H02J 2310/44; H02J 2310/46; H02J 3/007; H02J 3/008; H02J 3/36; H02J 7/00034; H02J 7/0025; H02J 7/0026; H02J 7/0029; H02J 7/007182; H02J 7/007192; H02J 7/143; H02J 1/00; H02J 1/10; H02J 1/108; H02J 1/12; H02J 1/16; H02J 13/00017; H02J 13/00024; H02J 13/00036; H02J 13/0005; H02J 13/0006; H02J 2310/10; H02J 3/00; H02J 3/001; H02J 3/0075; H02J 3/06; H02J 3/24; H02J 3/241; H02J 3/30; H02J 3/382; H02J 3/48; H02J 50/40; H02J 7/00032; H02J 7/0019; H02J 7/00302; H02J 7/00306; H02J 7/00308; H02J 7/0032; H02J 7/0071; H02J 7/022; H02J 7/025; H02J 7/1415; H02J 7/32; H02J 9/002; H02J 9/02; H02J 9/065

See application file for complete search history.

(56) References Cited

U.S. PATENT DOCUMENTS

| | | | |
|---|---|---|---|
| 5,747,734 A | 5/1998 | Kozlowski et al. | |
| 6,517,966 B1* | 2/2003 | Marukawa | H01M 4/60 429/157 |
| 6,555,991 B1 | 4/2003 | Zettel et al. | |
| 6,999,305 B1 | 2/2006 | Calcote | |
| 8,872,379 B2* | 10/2014 | Ruiz | B60L 1/003 307/66 |
| 9,878,634 B2 | 1/2018 | Sugeno et al. | |
| 9,997,955 B1* | 6/2018 | Ross | H02J 1/108 |
| 10,034,527 B2* | 7/2018 | Korey | A45C 5/03 |
| 10,164,464 B1* | 12/2018 | Ross | G06F 1/263 |
| 10,992,143 B2* | 4/2021 | Chen | H02J 7/0042 |
| 2003/0160593 A1 | 8/2003 | Yau et al. | |
| 2004/0164702 A1* | 8/2004 | Holmes | H01M 16/006 429/418 |
| 2004/0168818 A1* | 9/2004 | Layden | H02J 7/0031 174/50 |
| 2006/0024566 A1 | 2/2006 | Plummer | |
| 2007/0144804 A1* | 6/2007 | Pike | H01M 50/242 180/170 |
| 2008/0053716 A1* | 3/2008 | Scheucher | H01M 50/204 320/124 |
| 2009/0091332 A1 | 4/2009 | Emori et al. | |
| 2009/0208824 A1 | 8/2009 | Greening et al. | |
| 2010/0248029 A1* | 9/2010 | Butt | H01M 10/647 429/211 |
| 2011/0014501 A1* | 1/2011 | Scheucher | B60L 3/0046 429/7 |
| 2011/0049992 A1* | 3/2011 | Sant'Anselmo | H02S 10/12 307/64 |
| 2012/0019111 A1 | 1/2012 | Buescher et al. | |
| 2012/0074898 A1 | 3/2012 | Schwartz | |
| 2012/0086390 A1 | 4/2012 | Lim et al. | |
| 2012/0105001 A1 | 5/2012 | Gallegos et al. | |
| 2012/0170175 A1 | 7/2012 | Silberbauer et al. | |
| 2012/0235645 A1 | 9/2012 | Nakashima et al. | |
| 2013/0002016 A1 | 1/2013 | Furukawa et al. | |
| 2013/0021000 A1 | 1/2013 | Kuraishi et al. | |
| 2013/0026993 A1 | 1/2013 | Hintz et al. | |
| 2013/0043840 A1 | 2/2013 | Bylsma et al. | |
| 2013/0059180 A1* | 3/2013 | Yang | H01M 10/6556 429/156 |
| 2013/0063094 A1 | 3/2013 | Gibbs et al. | |
| 2013/0099746 A1 | 4/2013 | Nork et al. | |
| 2013/0113432 A1 | 5/2013 | Suzuki et al. | |
| 2013/0207616 A1 | 8/2013 | Shim | |
| 2014/0042972 A1 | 2/2014 | Kim et al. | |
| 2014/0097797 A1 | 4/2014 | Hendrix et al. | |
| 2014/0116870 A1* | 5/2014 | Kamen | E04H 3/02 202/83 |
| 2014/0152261 A1 | 6/2014 | Yamauchi et al. | |
| 2014/0178721 A1* | 6/2014 | Chung | H01M 50/249 429/71 |
| 2014/0186677 A1* | 7/2014 | Lim | H01M 10/6556 429/120 |
| 2014/0227577 A1* | 8/2014 | Lee | H01M 10/625 429/120 |
| 2014/0253135 A1 | 9/2014 | Eguchi et al. | |
| 2014/0306666 A1 | 10/2014 | Choi et al. | |
| 2015/0042281 A1* | 2/2015 | Marze | H02J 7/0036 320/115 |
| 2015/0188207 A1* | 7/2015 | Son | H01M 50/271 429/224 |
| 2016/0049809 A1 | 2/2016 | Kajitani et al. | |
| 2016/0093850 A1* | 3/2016 | DeKeuster | H01M 50/271 429/163 |
| 2016/0164148 A1* | 6/2016 | Yum | H01M 10/613 429/120 |
| 2016/0301222 A1 | 10/2016 | Samuel | |
| 2016/0336765 A1 | 11/2016 | Trimboli et al. | |
| 2017/0005376 A1* | 1/2017 | Harris | H01M 50/204 |
| 2017/0033408 A1* | 2/2017 | O'Hora | H02J 7/0048 |
| 2017/0033410 A1* | 2/2017 | Tohara | H02J 7/0045 |
| 2017/0077467 A1 | 3/2017 | Kronke et al. | |
| 2017/0084959 A1 | 3/2017 | Nakao et al. | |
| 2017/0126032 A1 | 5/2017 | Beaston | |
| 2017/0163060 A1 | 6/2017 | Zheng et al. | |
| 2017/0187084 A1* | 6/2017 | Park | H01M 10/613 |
| 2017/0207430 A1* | 7/2017 | Conrad | H01M 50/296 |
| 2017/0288184 A1* | 10/2017 | Schnakofsky et al. | |
| 2017/0288378 A1* | 10/2017 | Park | H02B 1/012 |
| 2017/0294633 A1 | 10/2017 | Zimbru, Jr. et al. | |
| 2018/0037134 A1* | 2/2018 | Weicker | H01M 10/425 |
| 2018/0097341 A1 | 4/2018 | Fiebig et al. | |
| 2018/0123357 A1* | 5/2018 | Beaston | H02J 3/381 |
| 2018/0131229 A1* | 5/2018 | Valin | H02J 7/35 |

(56) References Cited

U.S. PATENT DOCUMENTS

| | | | |
|---|---|---|---|
| 2018/0175430 A1* | 6/2018 | Modderno | H01M 8/2475 |
| 2018/0316215 A1* | 11/2018 | Lu | H05K 7/1492 |
| 2018/0358823 A1 | 12/2018 | Lemmen et al. | |
| 2018/0366699 A1* | 12/2018 | Geshi | H01M 10/6566 |
| 2019/0053400 A1* | 2/2019 | Hendrix | H05K 7/2059 |
| 2019/0109468 A1 | 4/2019 | Lopez et al. | |
| 2019/0131805 A1* | 5/2019 | Rush | H02J 1/001 |
| 2019/0176636 A1 | 6/2019 | Wu et al. | |
| 2019/0181653 A1 | 6/2019 | Wu et al. | |
| 2020/0006722 A1* | 1/2020 | Tanner | H01M 10/6556 |
| 2020/0062130 A1* | 2/2020 | Wuensche | H01M 50/209 |
| 2021/0159710 A1 | 5/2021 | Furukawa et al. | |
| 2022/0077513 A1* | 3/2022 | Thramann | B60L 58/26 |

FOREIGN PATENT DOCUMENTS

| | | | |
|---|---|---|---|
| CN | 102082309 B * | 9/2014 | B60L 11/007 |
| CN | 105429212 | 3/2016 | |
| CN | 106207032 A * | 12/2016 | H01M 10/613 |
| CN | 106849212 A * | 6/2017 | H02J 7/0014 |
| CN | 107769003 A * | 3/2018 | H02J 7/35 |
| CN | 107947288 | 4/2018 | |
| CN | 108110344 | 6/2018 | |
| DE | 112016003068 | 3/2018 | |
| FR | 3008240 A1 * | 1/2015 | H02B 1/40 |
| JP | 2009/050085 A | 3/2009 | |
| JP | 2010/166721 A | 7/2010 | |
| JP | 2013135686 A | 7/2013 | |
| JP | 2015/136268 A | 7/2015 | |
| WO | WO-2013150211 A1 * | 10/2013 | G06F 1/1632 |
| WO | WO-2013188680 A1 * | 12/2013 | B60K 6/28 |
| WO | WO-2014103038 A1 * | 7/2014 | H01M 10/613 |
| WO | WO-2016135807 A1 * | 9/2016 | H02J 7/00 |
| WO | WO 2017/178023 A1 | 10/2017 | |
| WO | WO 2020/033665 A1 | 2/2020 | |
| WO | WO 2020/033680 A1 | 2/2020 | |
| WO | WO 2019/208163 A1 | 5/2021 | |

OTHER PUBLICATIONS

International Search Report and Written Opinion issued in International Application No. PCT/US2019/050328, dated Dec. 4, 2019, 9 pages.

International Search Report and Written Opinion issued in International Application No. PCT/US2019/045678, dated Dec. 16, 2019, 12 pages.

International Search Report and Written Opinion issued in International Application No. PCT/US2019/045696, dated Dec. 11, 2019, 12 pages.

Extended European Search Report dated Mar. 31, 2022, from European Patent Application No. 19847972.7, 9 pp.

Extended European Search Report dated Apr. 5, 2022, from European Patent Application No. 19848236.6, 9 pp.

Extended European Search Report dated Jun. 22, 2022, from European Patent Application No. 19861075.0, 10 pp.

China National Intellectual Property Administration, Office Action and Search Report dated Apr. 19, 2023 for corresponding China Patent Application No. 201980059297.X, 26 pages w/English translation.

* cited by examiner

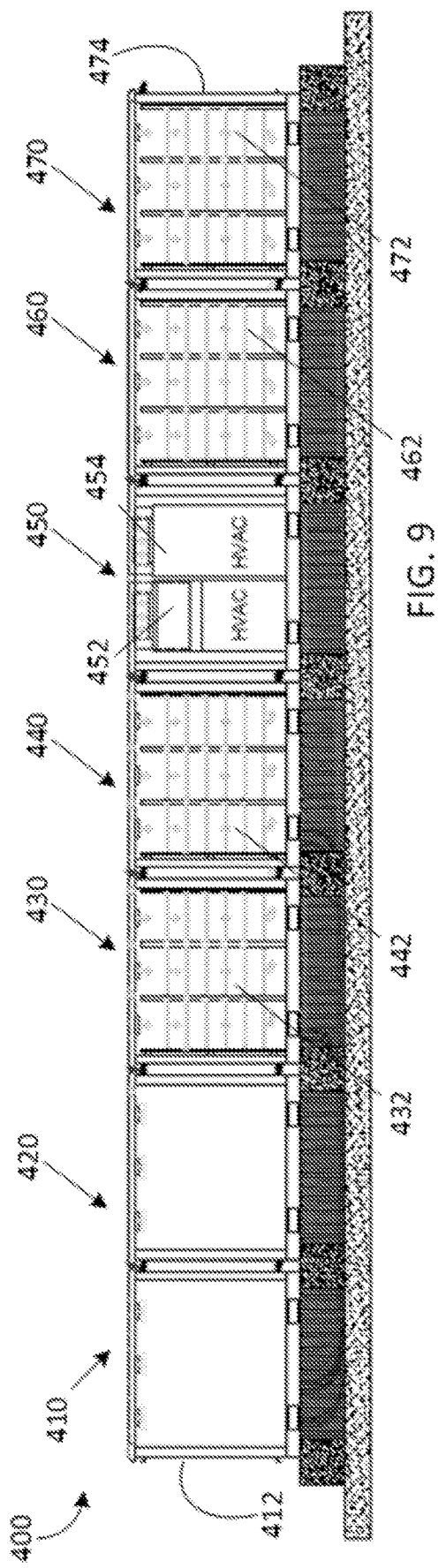
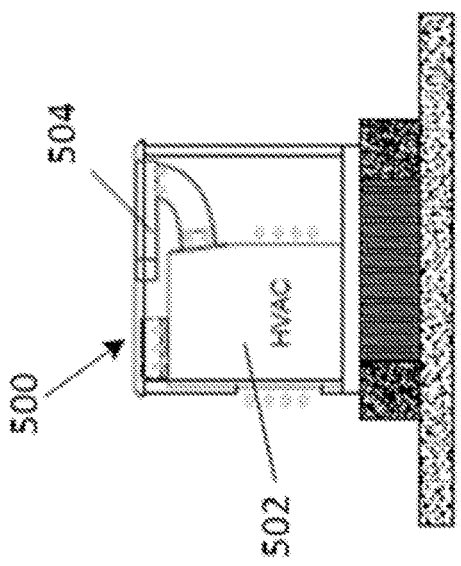

MODULAR BATTERY STACK AND SUPPORT SYSTEM

CROSS-REFERENCE TO RELATED APPLICATIONS

This application is the U.S. National Stage of International Application No. PCT/US2019/050328, filed Sep. 10, 2019, which was published in English under PCT Article 21(2), which in turn claims the benefit of and priority to the earlier filing date of U.S. Provisional Application No. 62/729,852, filed on Sep. 11, 2018, which applications are incorporated herein by reference in their entirety.

FIELD

This application relates to modular battery systems.

BACKGROUND

High performance battery systems have been developed and deployed for different use-case applications, such as for grid and microgrid energy storage and management, and for renewable energy integration (e.g., solar, wind, hydro, etc.). For example, solar energy may be collected and stored in battery systems for use during high-energy consumption times, such as during summer months when energy demands for air-conditioning are well above average.

Some current battery systems use fixed-size containers (e.g., 40 ft. containers) to house the components of the system. However, fixed-size containers are subject to numerous disadvantages. For example, large containers allow human entry and are therefore subject to building code, fixed-size containers are limited to being installed in spaces that can accommodate their dimensions, and systems installed within fixed-size containers are constrained to the provided size, often resulting in wasted space. Accordingly, a need exists for improved battery systems and housings.

SUMMARY

Embodiments of the technology described herein relate to battery systems including modular housings that allow a modular battery system to be customized to the size and additional requirements (e.g., electrical demands, heating and cooling requirements) of a selected installation site.

In a representative embodiment, a modular unit for use in a modular battery system can include a housing, a central component disposed within the housing, and one or more electrical distributor units coupled to the housing and operatively coupled to the central component. The housing can include a roof portion, a base portion, and two side portions. The modular unit can be configured to be operatively connected to one or more additional modular units to create a modular system.

In some embodiments, the central component of the modular unit can comprise a battery stack, an HVAC unit, a heating unit, a cooling unit, a fire suppression unit, a car-charging unit, a solar unit, a grid connector unit, an inverter unit, an AC collection unit, a DC collection unit, or any combination thereof.

In some embodiments, the electrical distributor unit can comprise a cable tray, a modular busbar, or any combination thereof.

In some embodiments, one or more of the side portions of the housing can comprise a door configured to allow a user to access the central component.

In another representative embodiment, a modular battery system can include a plurality of modular units, each modular unit comprising a housing, a central component disposed within the housing, and an electrical distributor unit. The housing can have a roof portion, a base portion, and two side portions, and can define one or more openings. The electrical distributor unit can be coupled to the housing and can be operatively coupled to the central component. The modular battery system can further comprise one or more sealing members configured to couple adjacent modular units to one another. The modular units can be disposed adjacent to one another such that a first opening of a first modular unit is in communication with a second opening of a second modular unit.

In some embodiments, the central components of the plurality of modular units can comprise a battery stack, an HVAC unit, a heating unit, a cooling unit, a fire suppression unit, a car-charging unit, a solar unit, a grid connector unit, an inverter unit, an AC collection unit, a DC collection unit, or any combination thereof.

In some embodiments, the modular battery system can further comprise one or more terminal units configured to cover one of the one or more openings in the housing. The terminal units can have a cable box coupled to an outer surface thereof.

In some embodiments, the sealing members can comprise a fastener coupled to a join between the first modular unit and the second modular unit. In some embodiments, the sealing members can further comprise a gasket disposed between the join and the fastener. In other embodiments, the sealing members can further comprise silicone gel disposed between the join and the fastener.

In another representative embodiment, a method of installing a modular battery system can comprise providing a first modular unit and a second modular unit. Each modular unit can comprise a housing, a central component disposed within the housing, and an electrical distributor unit coupled to the housing and operatively coupled to the central component. The housing can have a roof portion, a base portion, two side portions, and can define one or more openings. The method can further include disposing the second modular unit adjacent to the first modular unit such that a first opening of the first modular unit communicates with a first opening of the second modular unit and such that a join is formed between the first modular unit and the second modular unit. The first and second modular units can be coupled together using one or more sealing members, and the central components of the first and second modular units can be electrically connected.

In some embodiments, the act of coupling the first and second units together using one or more sealing members can comprise providing one or more sealing members comprising a gasket and a fastener, positioning the gasket over the join, positioning the fastener over the gasket, and coupling the fastener to the first and second modular units.

In some embodiments, the method further comprises operatively coupling the electrical distributor unit of the first modular unit to the electrical distributor unit of the second modular unit.

The foregoing and other objects, features, and advantages of the invention will become more apparent from the following detailed description, which proceeds with reference to the accompanying figures.

BRIEF DESCRIPTION OF THE DRAWINGS

FIG. 9 is a side view of exemplary embodiment of a modular battery system with the side portions of the housing removed for the purposes of illustration.

FIG. 10 is a side view of an exemplary embodiment of a modular unit with the side portions of the housing removed for the purposes of illustration.

DETAILED DESCRIPTION

Described herein are embodiments of a modular battery system and methods for installing such a system. A modular battery system can be formed from a plurality of modular units. The modular battery system can be, for example, configured to be connected to the power grid such that during times of excess power generation the excess power can be stored in the modular battery system for later use.

Figure 1:
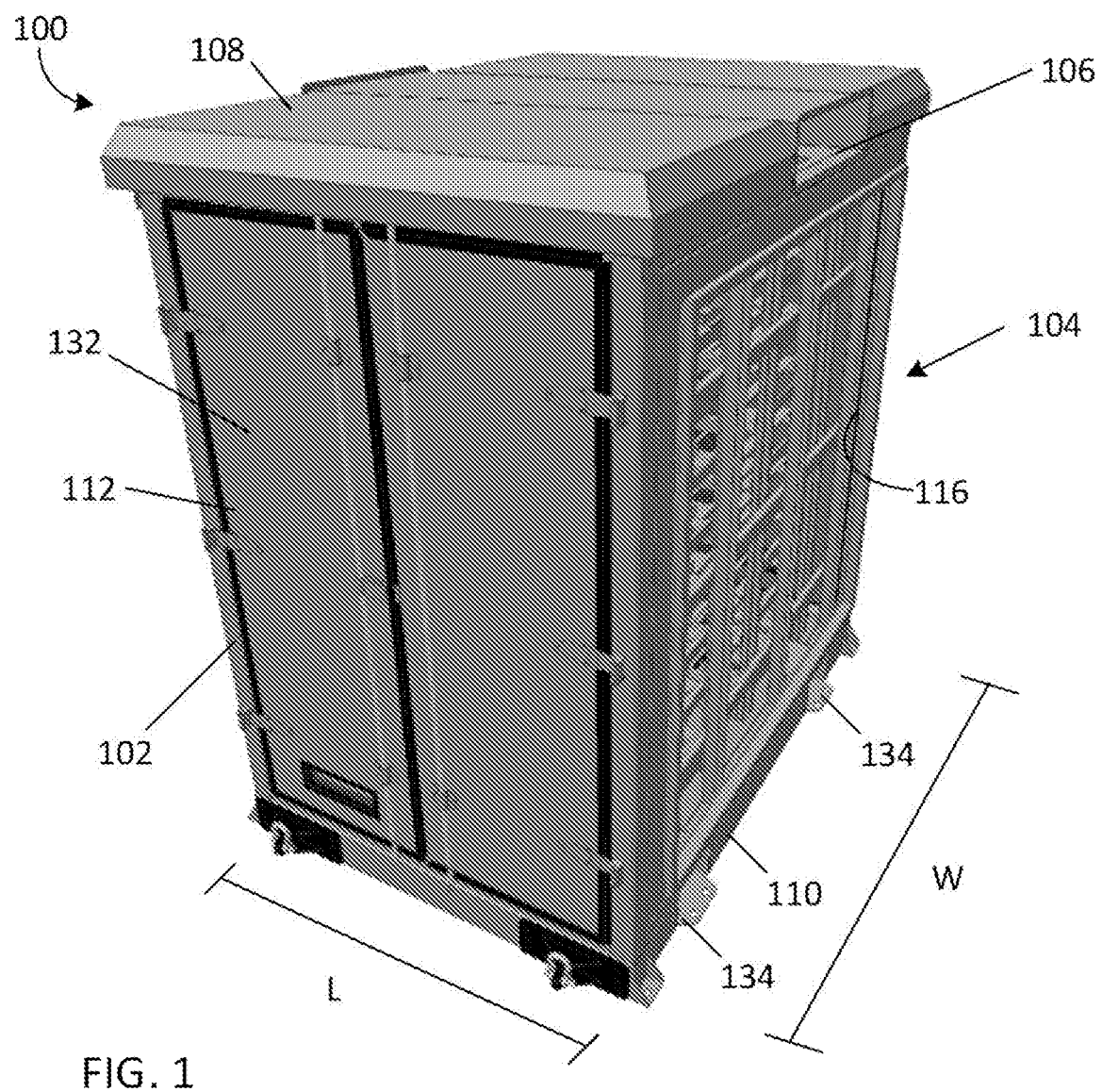
FIG. 1 is a perspective view of an exemplary embodiment of a modular unit.

FIGS. 1-5 show an exemplary modular unit 100, configured as a modular battery unit, according to one embodiment. As shown in FIG. 1, the modular unit 100 generally includes a housing 102, a central component 104 disposed within the housing, and one or more electrical distributor units 106. A plurality of modular units 100 can be coupled together to form a modular battery system (see e.g., modular battery system 400 of FIG. 9).

Figure 2:
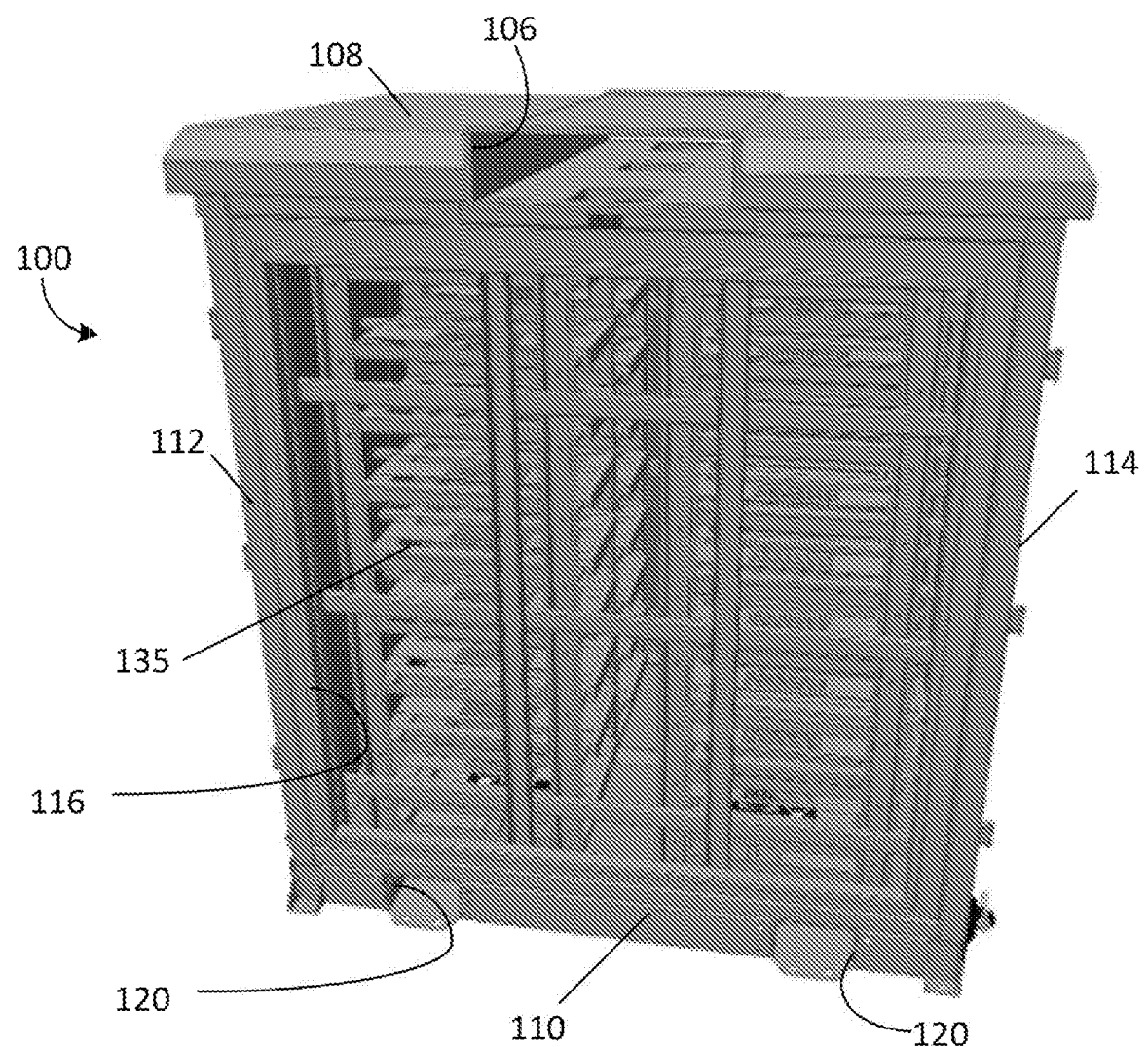
FIG. 2 is a perspective view of the modular unit of FIG. 1.

The housing 102 can include a roof portion 108, a base portion 110, a first side portion 112, and a second side portion 114 (see FIG. 2). The housing 102 can define a first aperture or opening 116, and a second aperture or opening 118 (see FIG. 5) on opposing sides of the housing adjacent the side portions 112, 114. In some embodiments, as shown, the base portion 110 can comprise forklift apertures 120, configured such that the tines of a forklift can extend into the apertures 120 to lift and position the modular unit 100. A forklift can be used to arrange one or more modular units to create a modular battery system. The side portions 112, 114 of the housing 102 can comprise doors or hatches 132 that allow a user to access the central component 104 within the housing 102.

In some embodiments, the modular unit 100 can have flanges 134 extending from the base portion 110 of the housing 102 to facilitate coupling the modular unit to one or more additional modular units. The flanges of adjacent modular units can overlap, creating a surface on which a sealing member can be disposed to couple the modular units to one another, as described in more detail below. In other embodiments, in lieu of or in addition to flanges extending from the base portion, the modular unit can have flanges extending from the roof portion and/or side portions.

Figure 4:
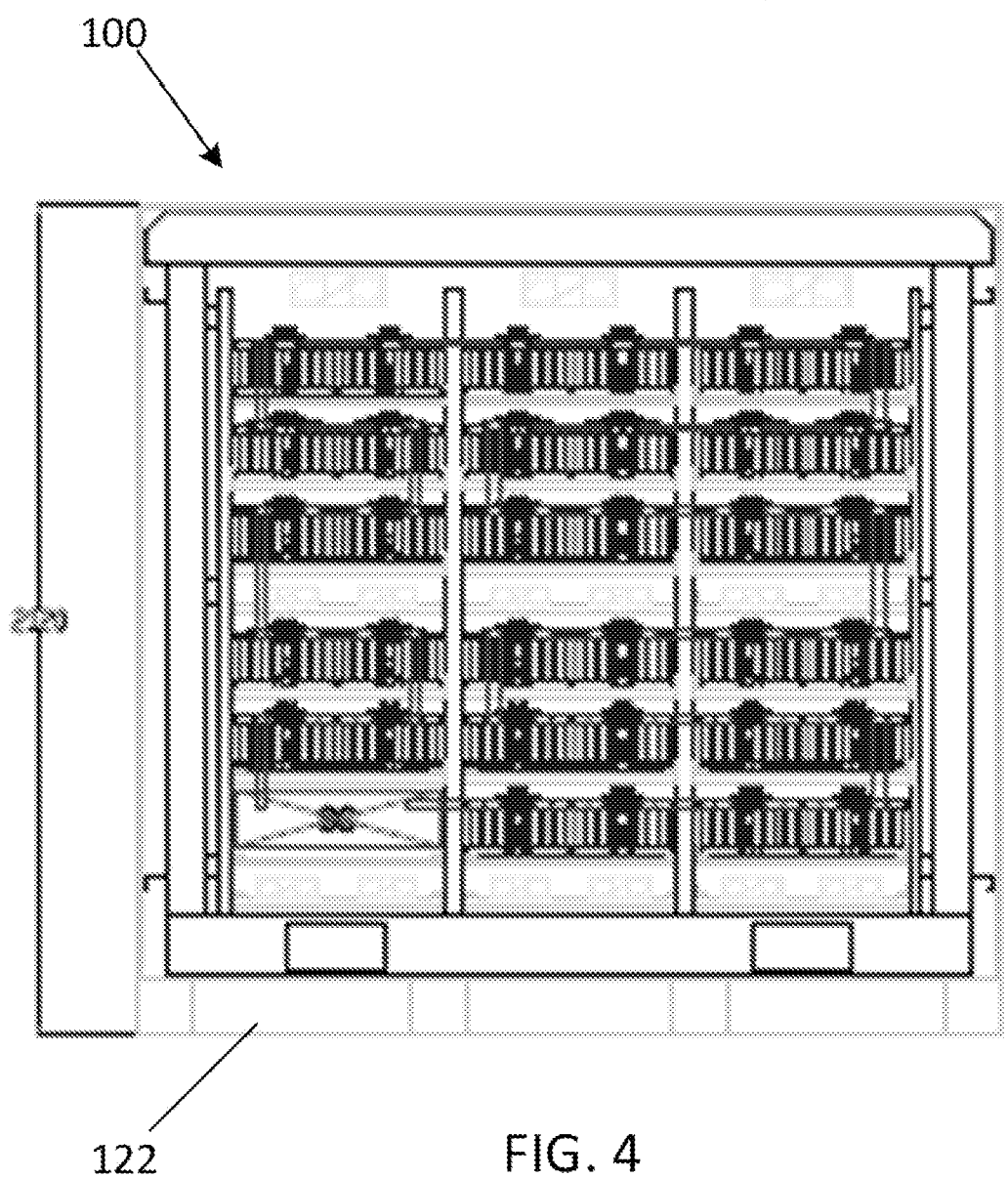

With reference to FIG. 4, in some embodiments, the modular unit 100 can further comprise a wooden housing 122 configured to enable the modular unit to be shipped.

The modular unit 100 can have a width W, a height H (see FIG. 3), and a length L. The width W can extend from the first side portion 112 to the second side portion 114, the height H can extend from the base portion 110 to the roof portion 108, and the length L can extend from the first opening 116 to the second opening 118. In the illustrated embodiment (see FIG. 5), the modular unit 100 has a square cross-section, that is, the length L and the width W are equal. However, in other embodiments (see e.g., FIG. 15) the modular unit can have, for example, a rectangular cross-section wherein the length is greater than the width or vice versa.

Figure 3:
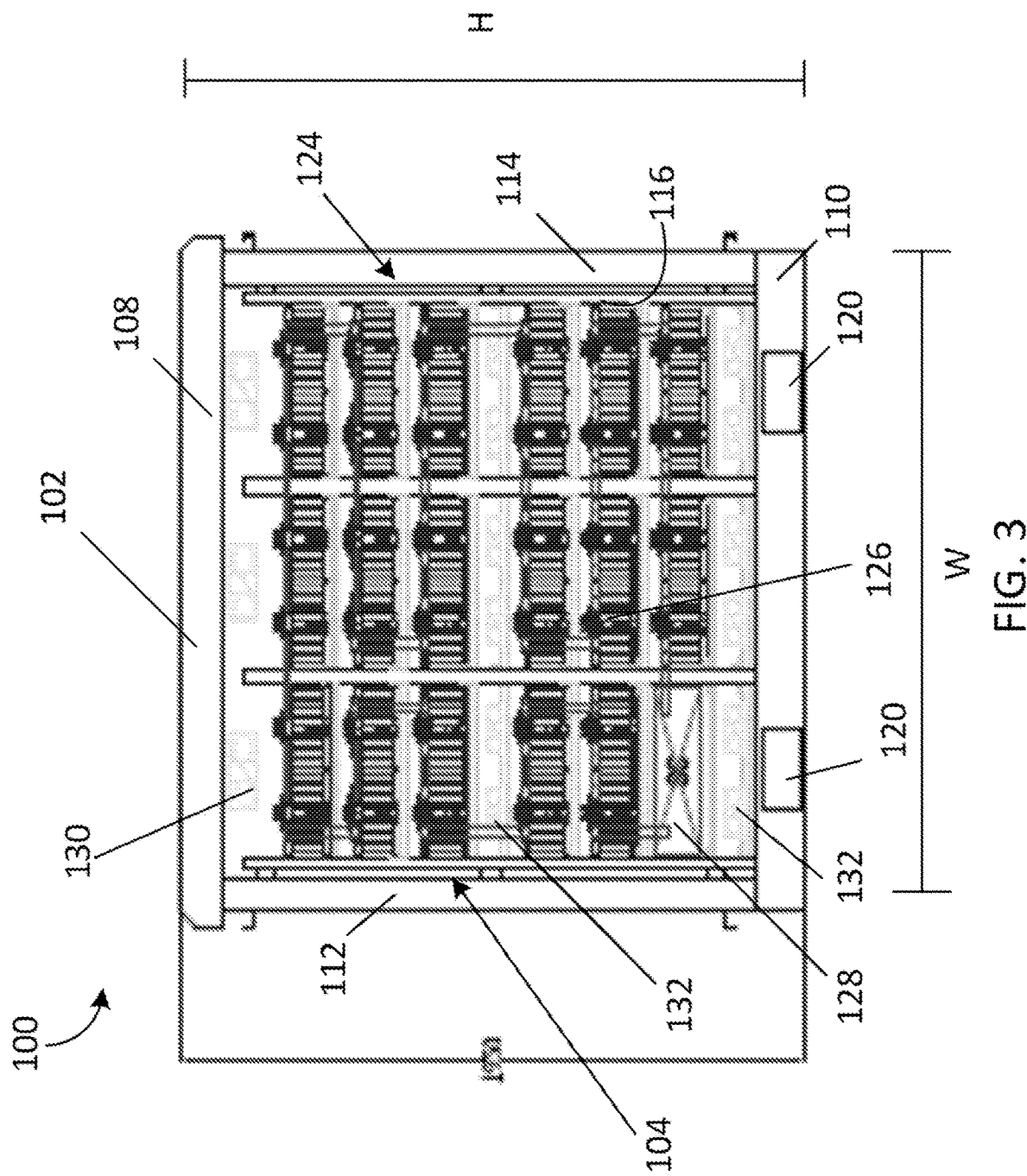
FIGS. 3-5 are various views of the modular unit of FIG. 1.
Figure 5:
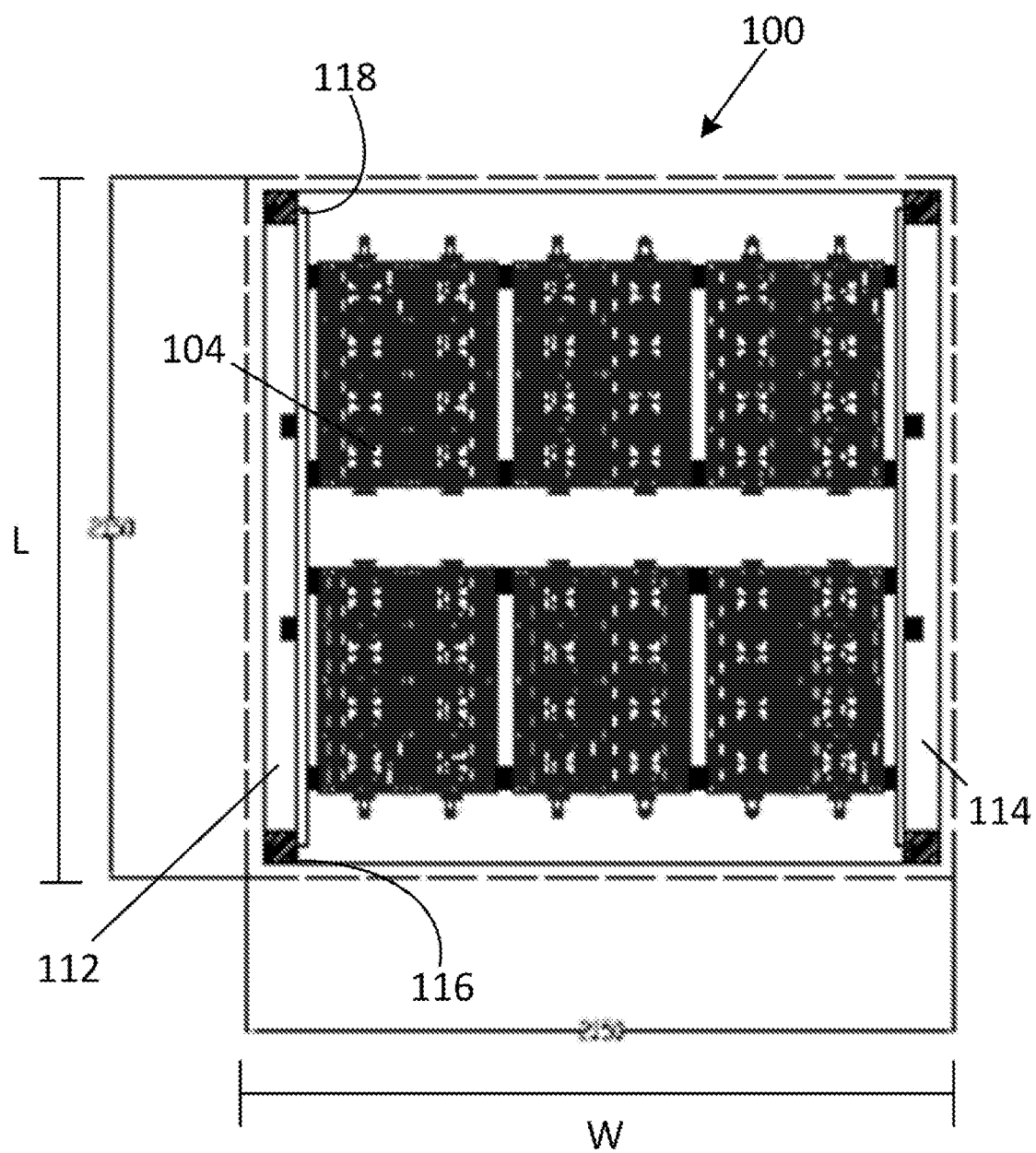

In particular embodiments, the modular unit 100 can have a height of between about 1500 and about 2500 mm, a length of between about 1500 and about 2500 mm, and a width of between about 1500 and about 2500. Referring now to FIGS. 3-5, in one specific example, a modular unit 100 can have a height H of 1950 mm, a width of 2150 mm, and a length of 2150 mm Referring now to FIGS. 13-15, in another specific example, a modular unit 700 can have a height $H_2$ of 2250 mm, a width $W_2$ of 1559 mm, and a length $L_2$ of 2150 mm. The narrow shape of such modular units can be preferable for installation sites having limited space.

The central component 104 can be disposed within the housing 102 such that the central component 104 abuts or nearly abuts the side walls 112, 114 (see e.g., FIG. 5). The central component 104 can comprise any of various units including, but not limited to: battery units, heating, ventilation, and air conditioning (HVAC) units, fire suppression units, car-charging units, solar units, grid connector units, inverter units, AC collection units, DC collection units, or any combination thereof.

FIGS. 1-5 illustrate a particular embodiment of a modular unit 100 having a central component 104 comprising one or more battery stacks 124. Each battery stack 124 can comprise one or more battery cells or packs 126 connected in series. The battery packs 126 are omitted from FIGS. 1-2 for purposes of illustration. In the illustrated embodiment, the central component 104 can comprise two battery stacks 124, each comprising seventeen battery packs 126 and a string controller 128. These battery stacks may be part of, or accompanied by, all or portions of an enhanced switched balancing network, as described in co-pending U.S. application Ser. No. 16/101,032, which is herein incorporated by reference in its entirety. These battery stacks may be part of, or accompanied by, all or portions of an enhanced battery management system, as described in co-pending U.S. application Ser. No. 16/101,045, which is herein incorporated by reference in its entirety.

Figure 13:
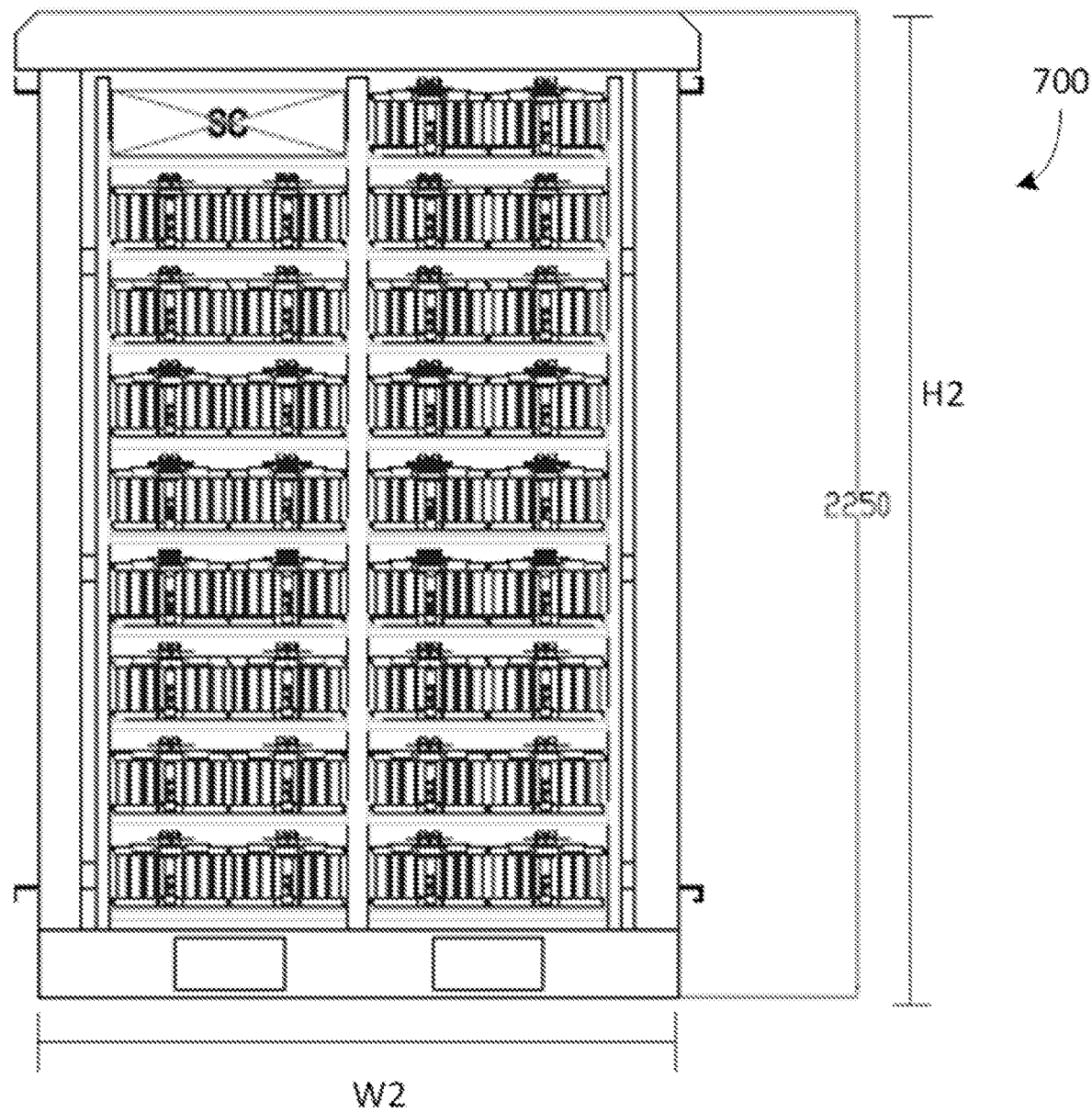
FIGS. 13-15 illustrate various views of an exemplary embodiment of a modular unit.
Figure 14:
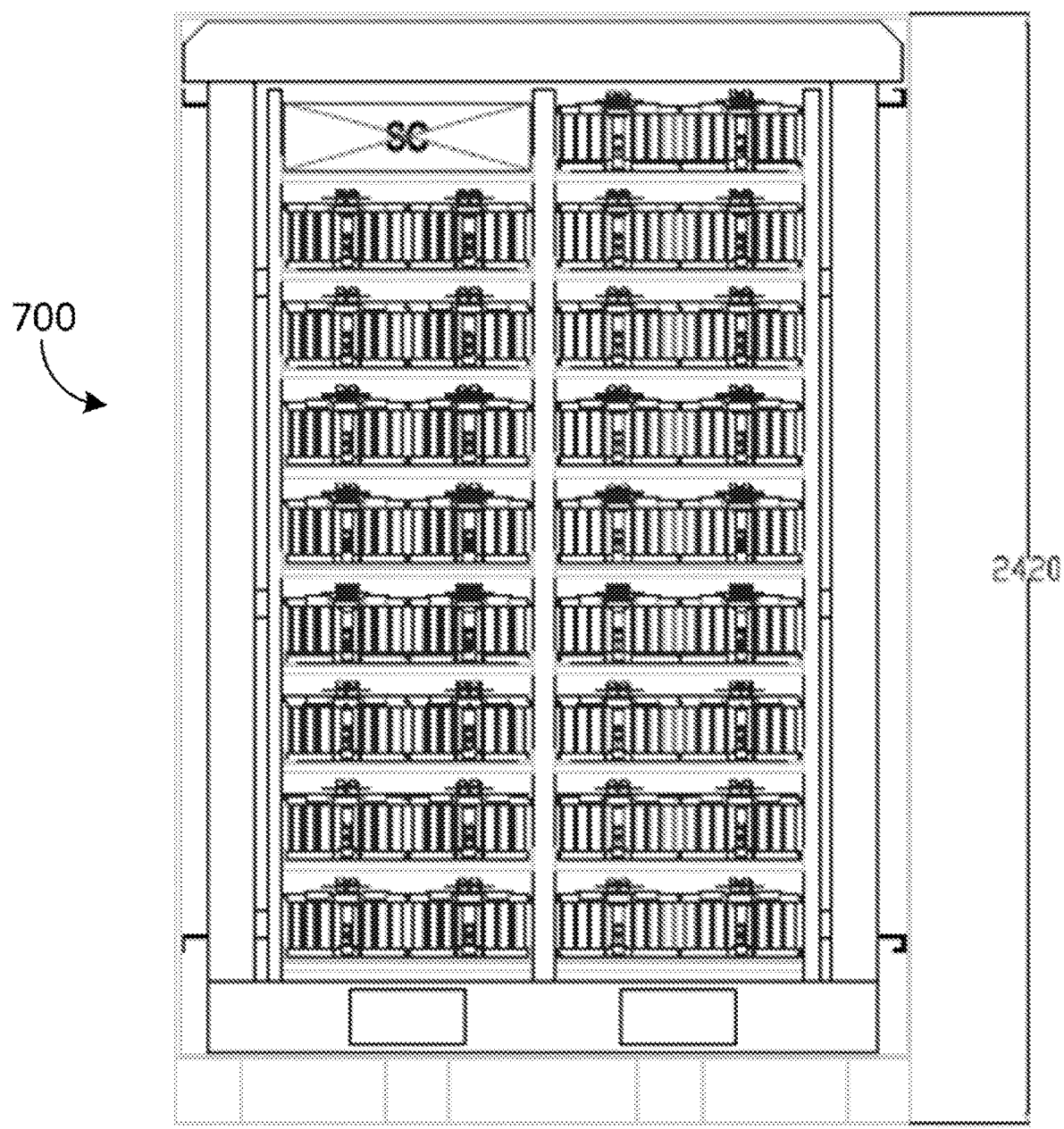
Figure 15:
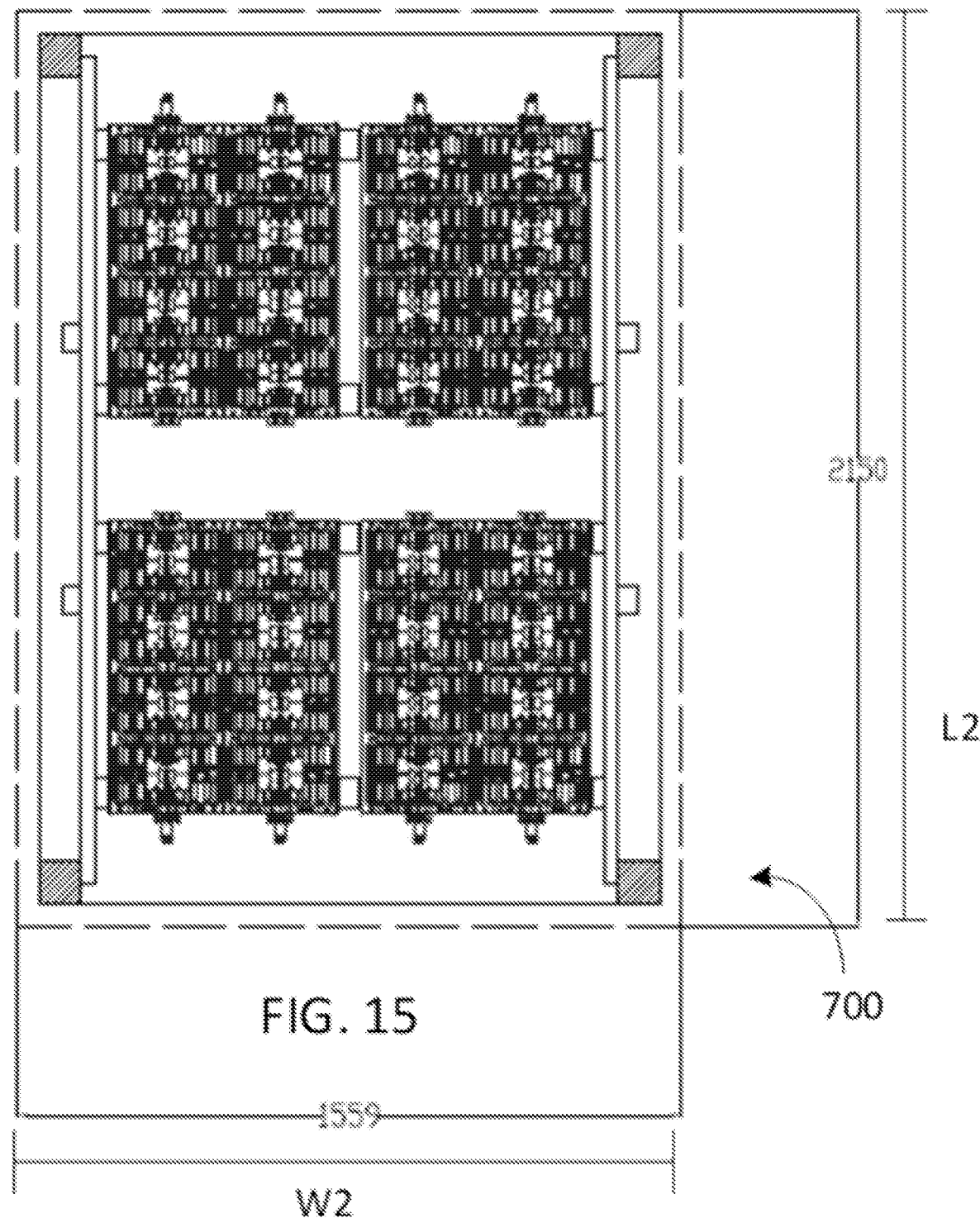

In some embodiments, such as shown in FIGS. 3-5, each battery stack can have a three by six configuration, having three columns of six rows each forming eighteen cells wherein a battery pack or other component can be disposed. In other embodiments, such as shown in FIGS. 13-15, each battery stack can have a two by nine configuration, having two columns of nine rows each forming eighteen cells wherein a battery pack or other component can be disposed. For example, in particular embodiments, a battery stack 124 can comprise seventeen batteries and one string controller to create a 1000-volt string.

As shown in FIGS. 1-2, the battery packs 126 can be disposed on a rack 135 affixed to the housing 102. Each battery pack 126 can be configured to be slideable relative to the rack, allowing each battery pack 126 to be replaced or modified individually. The battery cells of the battery packs 126 can be lithium-ion batteries, or any other known or future battery cell type. In lieu of or in addition to battery packs 126, the battery stack 124 can include, for example, a string controller, a plurality of balancing controllers, a plurality of cell group controllers, a plurality of cell group relays, and/or a plurality of cell groups.

Figure 6:
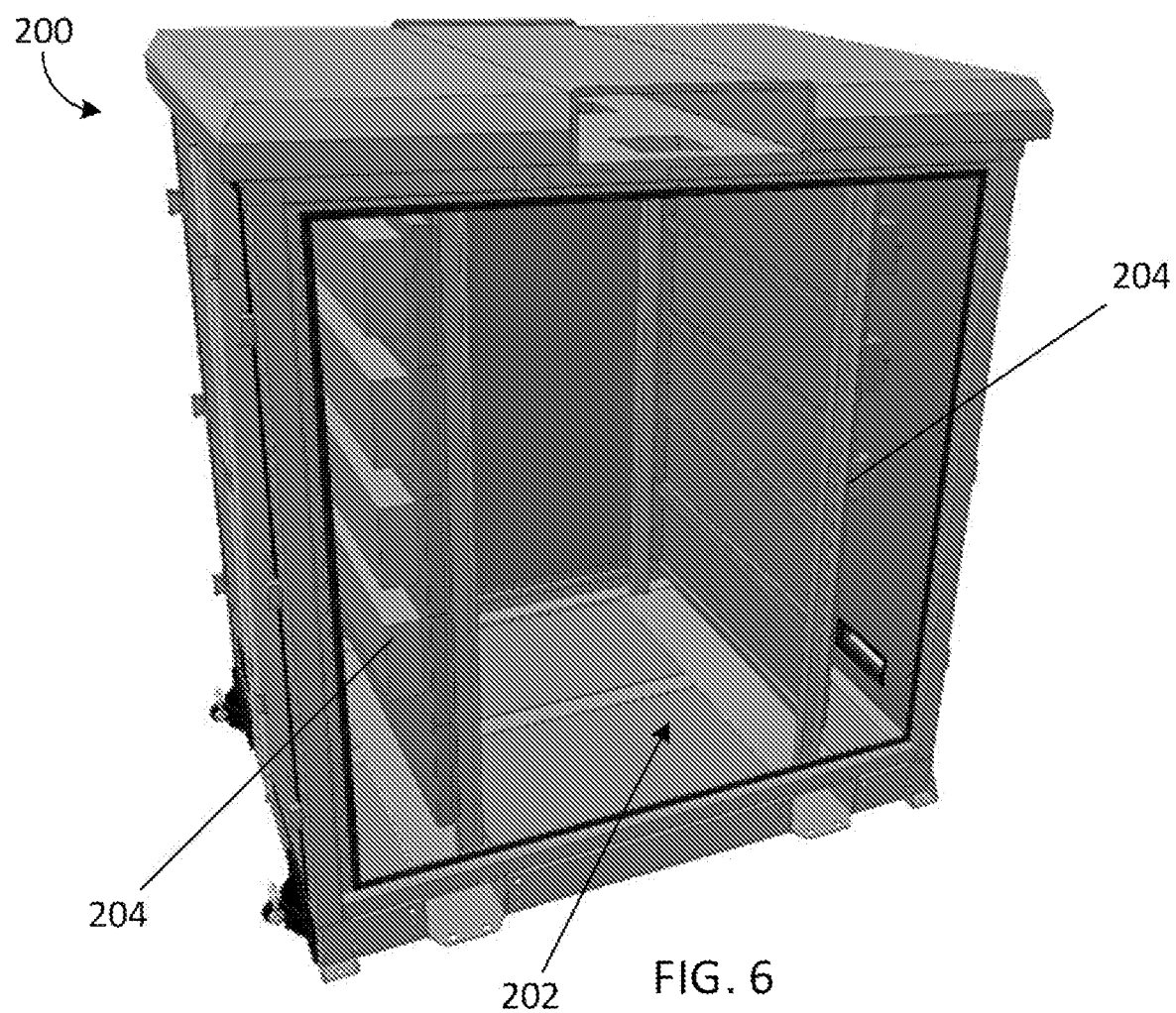
FIG. 6 is a perspective view of an exemplary embodiment of a modular unit.

FIG. 6 illustrates another particular embodiment of a modular unit 200. Modular unit 200 is similar to modular unit 100 except that modular unit 200 has a central component 202 that comprises an AC and/or DC collection unit 204.

Figure 7:
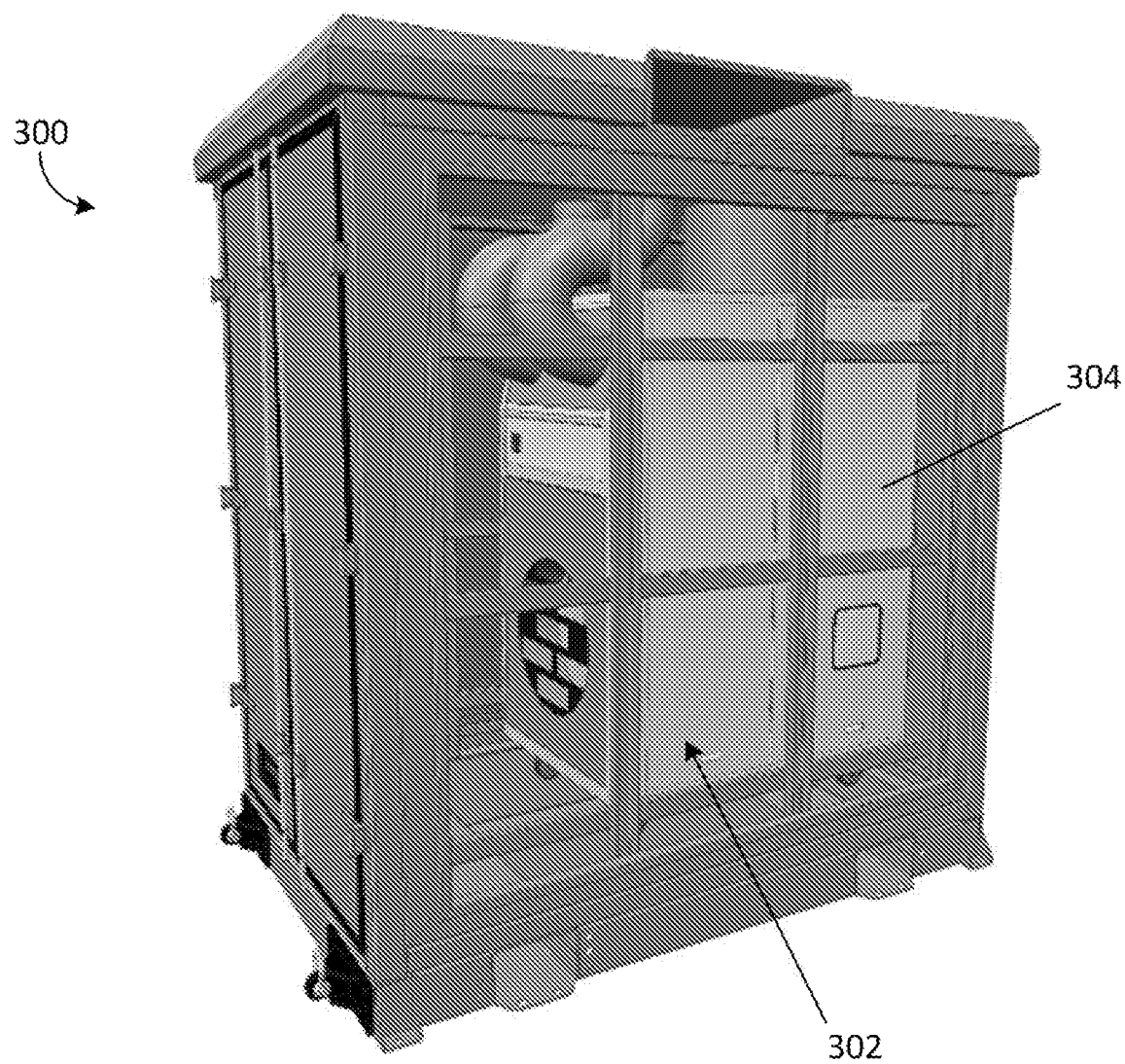
FIG. 7 is a perspective view of an exemplary embodiment of a modular unit.
Figure 8:
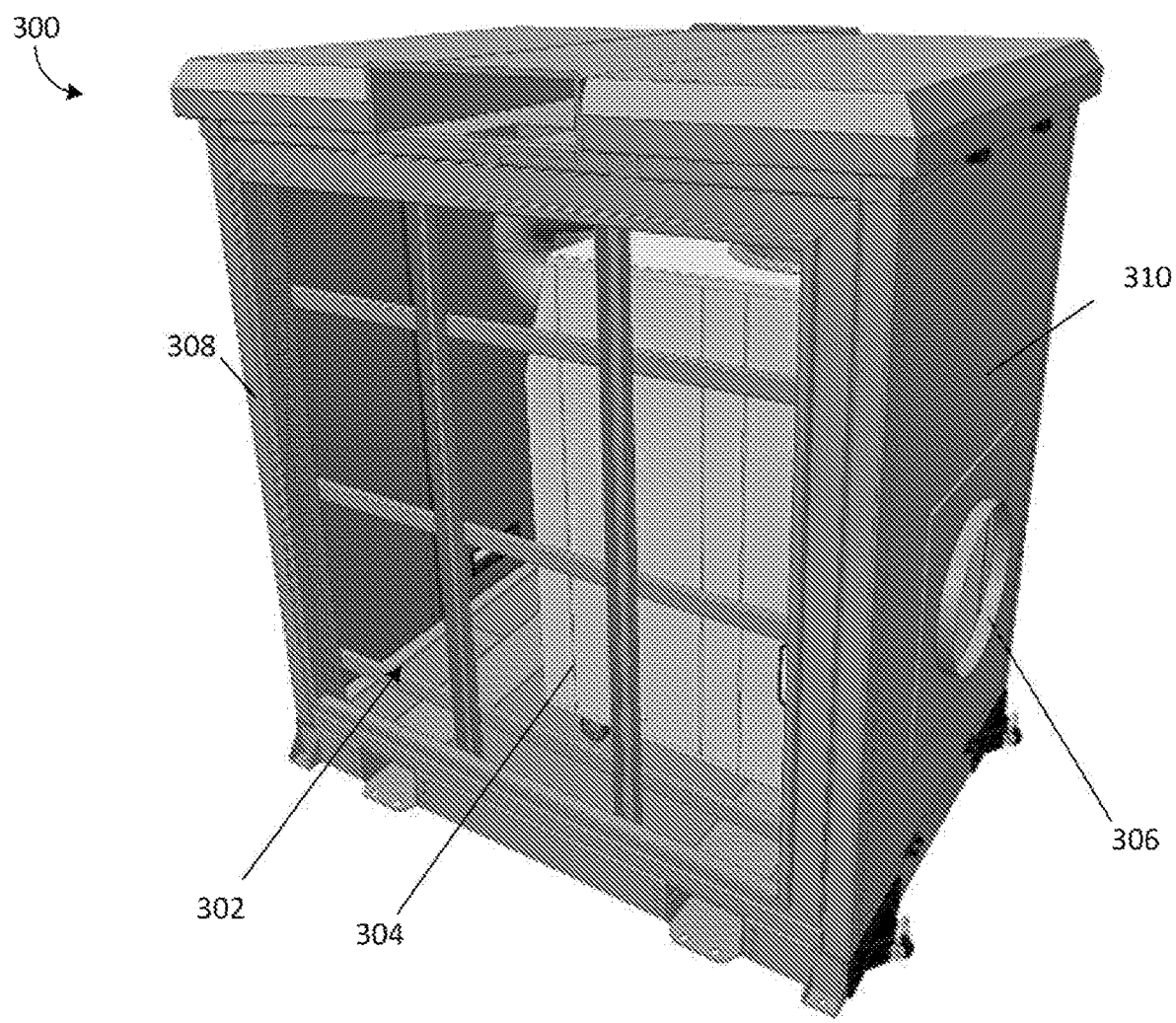
FIG. 8 is a perspective view of the modular unit of FIG. 7.

FIGS. 7-8 illustrate yet another particular embodiment of a modular unit 300. Modular unit 300 is similar to modular units 100 and 200, except that modular unit 300 has a central component 302 that comprises an HVAC system 304. The modular unit 300 can further comprise one or more vents 306 situated in the first and/or second side walls 308, 310.

A modular battery system (e.g., modular battery system 400 shown in FIG. 9) may be formed from a plurality of modular units, each of which can have an identical or different central component, as described in more detail below. For ease of description, a modular unit having a central component comprising one or more batteries will be referred to as a "modular battery unit," a modular unit having a central component comprising one or more HVAC units will be referred to as a "modular HVAC unit," a modular unit having a central component comprising one or more fire suppression units will be referred to as a "modular fire suppression unit," etc., and will be collectively referred to as "modular units."

Referring again to FIG. 1, each modular unit 100 can include one or more electrical distributor units 106. When arranged as part of a modular battery system, the electrical distributor units 106 of each modular unit 100 can be operatively connected to the electrical distributor units 106 of an adjacent modular unit (e.g., modular unit 100, 200, and/or 300), as described in more detail below. The electrical distributor units 106 can, for example, extend through the roof portion 108, as shown in FIGS. 1-2. In other embodiments (see e.g., FIG. 9), the electrical distributor units can be situated beneath the modular units (e.g., coupled to an external surface of the base portion).

The electrical distributor units 106 can comprise cable trays configured to contain a plurality of cables (not shown) extending from the central component 104. In other embodiments, the electrical distributor units 106 can comprise one or more busbars operatively connected to the central component 104.

Referring now to FIG. 3, the modular unit 100 can further comprise one or more fan layers 130 and/or one or more heating layers 132. The fan layers 130 can comprise one or more fan units and can be disposed on an inner surface of the roof portion 108. For example, three fan units are shown in the illustrated embodiment, however, in other embodiments a greater or fewer number of fan units can be used. The fan layer(s) can be configured to reduce the temperature within the modular unit to provide an optimal temperature for the central component (e.g., to provide an optimal temperature for battery function). The one or more heating layers 132 can comprise one or more heating units. The heating layers can be disposed beneath the central component 104 and/or extending through a central portion of the central component 104. For example, the illustrated embodiment shows two heating layers 132, a first heating layer comprising six heating units and disposed beneath the central component 104 adjacent the base portion 110 of the housing 102, and a second heating layer 132 comprising six heating units extending through a central portion of the central component 104. In other embodiments, a greater or fewer number of heating units can be used. The heating layer(s) can be configured to increase the temperature within the modular unit to provide an optimal temperature for the central component (e.g., to provide an optimal temperature for battery function).

A plurality of modular units can be coupled together to form a modular battery system. Each modular unit can be coupled to one or more adjacent units using a sealing member. The modular units that make up a modular battery system can have various different central components (e.g., a battery stack, an HVAC unit, a heating unit, a cooling unit, a fire suppression unit, a car-charging unit, a solar unit, a grid connector unit, an inverter unit, an AC collection unit, a DC collection unit, or any combination thereof). Any combination of modular units having any of various central components can be used to form a modular battery system.

The central components of the modular units of the modular battery system can be selected according to the requirements of the system. In a particular example, as shown in FIGS. 9-10, an exemplary modular battery system 400 can comprise two modular AC and/or DC collection units 410, 420, four modular battery units 430, 440, 450, 460, each comprising one or more battery stacks 432, 442, 462, 472 respectively, and one modular HVAC unit 450. The modular HVAC unit 450 can comprise two HVAC systems 452, 454, configured to heat, cool, and ventilate the modular battery system 400. The HVAC systems can be coupled to ducting that extends throughout the modular battery system 400. For example, FIG. 10 shows a modular HVAC unit 500 having a single HVAC system 502 coupled to ducting 504.

Referring again to FIG. 9, the electrical distributor units 402 of each modular unit 410, 420, 430, 440, 450, 460, 470 can be operatively connected to the adjacent modular unit such that cables extending from the central component of each modular unit 410, 420, 430, 440, 450, 460, 470 can extend at least partially along the length of the modular battery system 400. In embodiments wherein the electrical distributor units are cable trays, operatively coupling the cable trays can comprise aligning the trays such that cables can extend from one modular unit into another modular unit until the cables reach a terminal end of the modular battery system.

Figure 12:
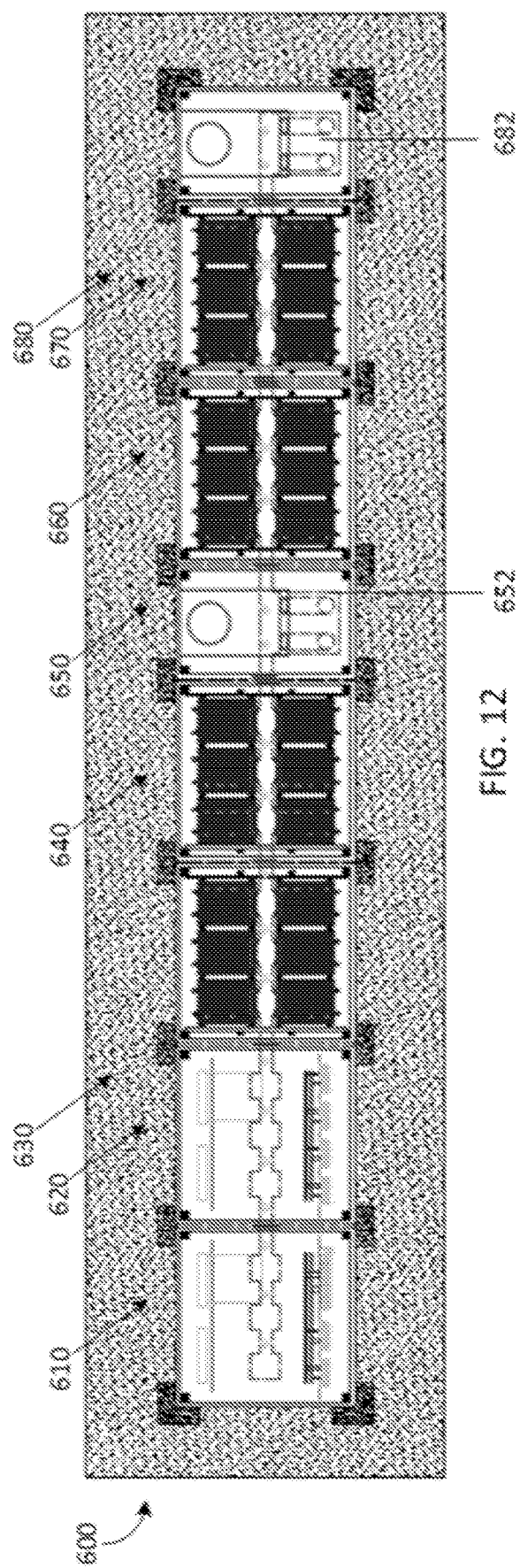
FIG. 12 is a top plan view of an exemplary embodiment of a modular battery system with the roof portion of the housing removed for the purposes of illustration.

FIG. 12 shows another particular example of a modular battery system 600. Modular battery system 600 is similar to modular battery system 400, having two modular AC and/or DC collection units 610, 620 and four modular battery units 630, 640, 660, 670 except that modular battery system 600 has two modular HVAC units 650 and 680, each comprising one HVAC system, 652 and 682, respectively.

The modular units of a modular battery system can be placed adjacent one another such that an opening of a first modular unit is adjacent an opening of a second modular unit, thereby forming a segment having a continuous inner cavity.

The modular units can be coupled together using one or more sealing members. The sealing members can be configured such that water is prevented from entering the inner cavity of the modular battery system via the join between adjacent modular units. The sealing members can comprise, for example, a fastener that is configured to cover the join and be coupled to the modular units on either side of the join (e.g., using welding, adhesives, or mechanical means such as bolts, clamps, or latches). The fastener can comprise any of various materials, for example, metal, rubber, polymer, etc. The sealing member can further comprise gasketing or silicone gel configured to provide additional water-proofing. In some embodiments, the sealing member need not comprise a fastener and can be solely comprised of gasketing, a rubber seal, or silicone gel.

Once assembled in a selected configuration, the modular battery system can have a first terminal opening (e.g., a first opening of a first terminal modular unit) and a second terminal opening (e.g., a second opening of a second terminal modular unit). For example, in the configuration shown in FIG. 2, the first terminal opening of the modular battery system 400 is the left-most opening 412 of the left-most modular unit 410 and the second terminal opening is the right-most opening 474 of the right-most modular unit 470. In other embodiments, the modular battery system can have a branching configuration and can comprise three or more terminal ends.

The terminal openings of the modular battery system can be capped or bounded using terminal units to prevent the entry of water or other potentially damaging elements. A terminal unit can comprise a cap configured to fit over, fit within, or otherwise seal an opening of a modular unit, thereby preventing access to the central component and preventing the entrance of water or other potentially damaging elements via the opening of the modular unit. In some embodiments, a terminal unit can further comprise a collector, such as an all-weather cable and/or electrical box, coupled to an outer surface of the terminal unit and configured to collect a plurality of cables from the electrical distributor units and provide access to the cables.

The continuous inner cavity formed within the modular battery system is advantageous because it allows common HVAC units to be used to heat, cool, and ventilate all the modular units of a particular modular battery system, rather than requiring individual heating and cooling systems for each modular unit. Furthermore, the continuous inner cavity allows cables to run between numerous modular units (e.g., within the electrical distributor units) along the length of the modular battery system and be collected by, for example, a terminal unit comprising a collector.

Figure 11:
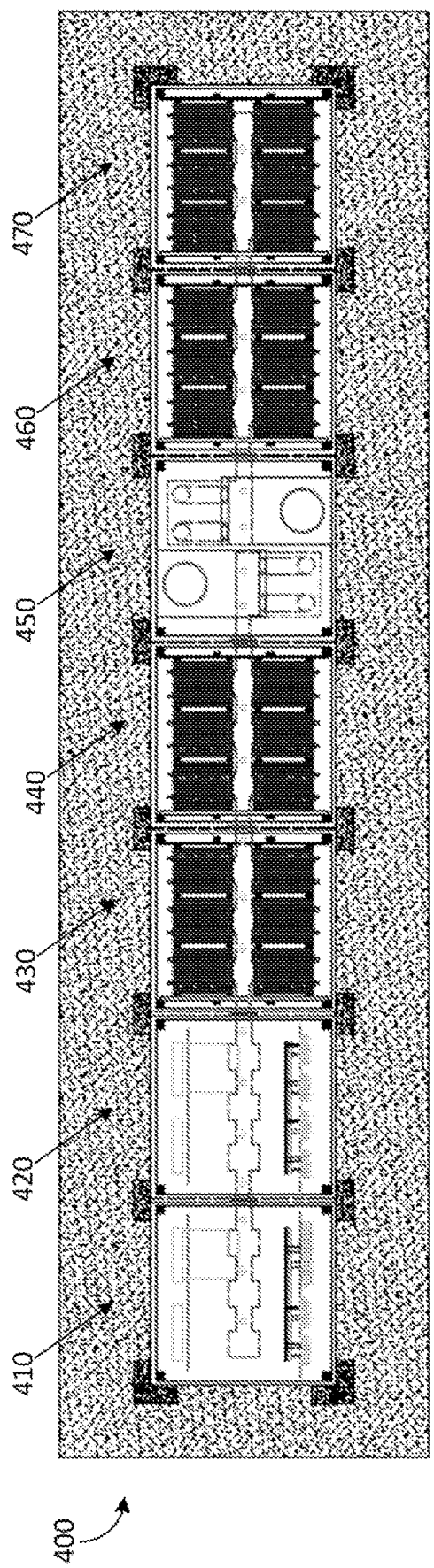
FIG. 11 is a top plan view of the modular battery system of FIG. 9 with the roof portion of the housing removed for the purposes of illustration.

In some embodiments (see e.g., modular battery system 400 of FIG. 11), each modular unit within a modular battery system can have the same or similar dimensions. In other embodiments (see e.g., modular battery system 600 of FIG. 12), some or all of the modular units can vary in size.

In some embodiments, the modular battery system can further include modular units configured as turning units. Turning units can have an L-shaped housing and can be configured to create a right-hand or left-hand turn in the overall shape of the modular battery system. Turning units can optionally comprise a central component, and can comprise one or more electrical distributor units.

A modular battery system can be installed in the following exemplary manner A first modular unit, for example, a first modular battery unit, can be disposed adjacent to a second modular unit, for example, a second modular battery unit. The first and second modular units can be aligned such that a second opening of the first modular unit is continuous with a first opening of the second modular unit and such that the electrical distributor unit of the first modular unit is operatively connected to the electrical distributor unit of the second modular unit.

The adjacent modular units can then be coupled together using one or more sealing members. For example, a gasket can be aligned along the join between the adjacent modular units, and a metal fastener can be placed over the gasket and coupled to the first and second modular units using welding or other fastening means.

A third modular unit, for example, a modular HVAC unit, can be coupled to the second modular unit using the method described above. A fourth modular unit, for example, a grid connector unit, can be coupled to the third modular unit using the method described above. Additional modular units can be added based on the space and/or electrical demands of the selected installation site.

Once the selected modular battery system configuration has been arranged and coupled together, the terminal openings of the system can be capped using two or more terminal units. Each terminal unit can be coupled to a terminal opening using, for example, the coupling method described above. Once fully assembled, the central components of the modular units can be accessed using the doors in the side portions of the housing.

The easily-assembled, modular nature of the modular battery systems described herein allows the systems to be customized to the size and electrical demands of a selected installation location.

General Considerations

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

All features described herein are independent of one another and, except where structurally impossible, can be used in combination with any other feature described herein.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In the following description, certain terms may be used such as "up," "down," "upper," "lower," "top," "bottom," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Unless otherwise indicated, all numbers expressing dimensions (e.g., heights, widths, lengths, etc.), angles, quantities of components, percentages, temperatures, forces, times, and so forth, as used in the specification or claims, are to be understood as being modified by the term "about." Accordingly, unless otherwise indicated, implicitly or explicitly, the numerical parameters set forth are approximations that can depend on the desired properties sought and/or limits of detection under test conditions/methods familiar to those of ordinary skill in the art. When directly and explicitly distinguishing embodiments from discussed prior art, the embodiment numbers are not approximates unless the word "about" is recited. Furthermore, not all alternatives recited herein are equivalents.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A battery system comprising:
    a first modular unit comprising:
        a first housing having a first cavity defined therein, a first side having a first opening connected to the first cavity, a second side opposite the first side, and a front portion connecting the first side and the second side;
        a battery stack; and
        a first electrical distributor unit attached to the first housing and operatively coupled to the battery stack, the first electrical distributor unit extending between the first side of the first housing and the second side of the first housing; and
    a second modular unit comprising:
        a second housing having a second cavity defined therein, a first side, a second side opposite the first side, and a front portion connecting the first side and the second side, the second side having a second opening connected to the second cavity; and
        a second electrical distributor unit attached to the second housing and extending between the first side of the second housing and the second side of the second housing;
    wherein the first opening of the first housing occupies at least 50% of an area of the first side of the first housing, wherein the second opening of the second housing occupies at least 50% of an area of the second side of the second housing, wherein the first modular unit and the second modular unit are configured to be disposed adjacent to each other such that the first opening of the first housing is aligned with the second opening of the second housing and a continuous inner cavity is formed between the first modular unit and the second modular unit, wherein the first electrical distributor unit of the first modular unit is configured to be connected to the second electrical distributor unit of the second modular unit, and wherein the front portion of one or both of the first housing and the second housing is configured to allow a user to access one or both of the first cavity and the second cavity while the first modular unit and the second modular unit are connected to one another and positioned side by side.

2. The battery system of claim 1, wherein the second modular unit further comprises an electrical component operatively coupled to the second electrical distributor unit.

3. The battery system of claim 2, wherein the electrical component comprises a battery stack, an HVAC unit, a heating unit, a cooling unit, a fire suppression unit, a car charging unit a solar unit, a grid connector unit, an inverter unit, an AC collection unit, or a DC collection unit, or any combination thereof.

4. The battery system of claim 1, wherein the battery stack comprises a string controller and a plurality of cell group stacks, each cell group stack comprising a plurality of cell groups and a balancing controller configured to balance the plurality of cell groups in response to controls from the string controller.

5. The battery system of claim 1, wherein the battery stack comprises a plurality of battery packs and a string controller operatively coupled to the battery packs.

6. The battery system of claim 5, further comprising a rack disposed within the first cavity, wherein each battery pack is slidably coupled to the rack.

7. The battery system of claim 1, further comprising a heating unit or a fan unit, or a combination thereof, operatively coupled to the first cavity.

8. The battery system of claim 1, wherein the second side of the first housing comprises a second opening connected to the first cavity, wherein a terminal unit is mounted at the second opening of the first housing, and wherein the terminal unit comprises a cable box.

9. The battery system of claim 1, further comprising a sealing member disposed at an interface between the first housing and the second housing.

10. The battery system of claim 9, wherein the sealing member comprises a gasket or silicon gel.

11. The battery system of claim 9, further comprising a fastener positioned over the interface and coupled to the first housing and the second housing.

12. The battery system of claim 1, wherein the first housing comprises a first flange, wherein the second housing comprises a second flange, and wherein the first flange and the second flange overlap when the modular units are disposed adjacent to each other to form the continuous inner cavity.

13. The battery system of claim 12, further comprising a sealing member disposed between the overlapping first and second flanges.

14. The battery system of claim 1, further comprising a third modular unit, the third modular unit comprising a third housing having a third cavity defined therein, a first side, and a second side opposite the first side, the second side having a second opening connected to the third cavity;
    wherein the first side of the second housing comprises a first opening connected to the second cavity; and
    wherein the third modular unit is configured to be disposed adjacent to the second modular unit such that the second opening of the third housing is aligned with the first opening of the second housing and the continuous inner cavity extends to the third modular unit.

15. The battery system of claim 1, wherein the first housing comprises a first door opening in the front portion of the first housing and a first door mounted for controlled access to the first cavity through the first door opening, and wherein the second housing comprises a second door opening in the front portion of the second housing and a second door mounted for controlled access to the second cavity through the second door opening.

16. A battery system comprising:
a plurality of housings disposed adjacent to each other and coupled together, each of the housings comprising a first side, a second side, a front portion connecting the first side and the second side, a cavity and one or more side openings connected to the cavity, each of the one or more side openings being occupying at least 50% of an area of a the first side or the second side of the corresponding housing, wherein the cavities and the side openings of the housings form a continuous inner cavity extending between the plurality of housings;
a battery stack disposed within one of the housings; and
an electrical distributor unit attached to the one of the housings and operatively coupled to the battery stack,
wherein the front portion of at least one of the housings is configured to allow a user to access one or more of the cavities while the plurality of housings are disposed adjacent to each other and coupled together.

17. The battery system of claim 16, further comprising a battery stack, an HVAC unit, a heating unit, a cooling unit, a fire suppression unit, a car charging unit a solar unit, a grid connector unit, an inverter unit, an AC collection unit, or a DC collection unit disposed within the cavity of each of the remaining housings.

18. The battery system of claim 16, wherein the battery stack comprises a string controller and a plurality of cell group stacks, each cell group stack comprising a plurality of cell groups and a balancing controller configured to balance the plurality of cell groups in response to controls from the string controller.

19. The battery system of claim 16, further comprising a rack disposed within the cavity of the one of the housings;
wherein the battery stack comprises a plurality of battery packs and a string controller operatively coupled to the battery packs; and
wherein each battery pack is slidably coupled to the rack.

20. A method of installing a battery system comprising:
disposing a first side of a first modular unit adjacent to a second side of a second modular unit such that a first opening occupying at least 50% of an area of the first side of the first modular unit is aligned with a second opening occupying at least 50% of an area of the second side of the second modular unit and a continuous inner cavity is formed between the first modular unit and the second modular unit and such that the continuous inner cavity is accessible by a user via a door in a front portion of the first modular unit or of the second modular unit;
connecting a first electrical distributor unit of the first modular unit to a second electrical distributor unit of the second modular unit, wherein the first electrical distributor unit extends between the first side of the first modular unit and a second side of the first modular unit opposite the first side of the first modular unit, and wherein the second electrical distributor unit extends between the second side of the second modular unit and a first side of the second modular unit opposite the second side of the second modular unit;
operatively coupling a battery stack within the first modular unit to the first electrical distributor; and
forming a sealing join between the first side of the first modular unit and the second side of the second modular unit,
wherein the front portion connects the first side and the second side of the modular unit that comprises the door.

* * * * *